（12） United States Patent
Hirano et al.

(10) Patent No.: US 8,209,529 B2
(45) Date of Patent: Jun. 26, 2012

(54) AUTHENTICATION SYSTEM, NETWORK LINE CONCENTRATOR, AUTHENTICATION METHOD AND AUTHENTICATION PROGRAM

(75) Inventors: Takashi Hirano, Tokyo (JP); Atsushi Nunome, Kyoto (JP); Hiroaki Hirata, Kyoto (JP); Kiyoshi Shibayama, Kyoto (JP)

(73) Assignee: NEC Corporation, Tokyo (JP)

( * ) Notice: Subject to any disclaimer, the term of this patent is extended or adjusted under 35 U.S.C. 154(b) by 1737 days.

(21) Appl. No.: 11/179,602

(22) Filed: Jul. 13, 2005

(65) Prior Publication Data

US 2006/0015714 A1 Jan. 19, 2006

(30) Foreign Application Priority Data

Jul. 14, 2004 (JP) .................................. 2004-206662

(51) Int. Cl.
H04L 29/06 (2006.01)
(52) U.S. Cl. ....................................... 713/151; 713/155
(58) Field of Classification Search .......... 713/151–155, 713/182
See application file for complete search history.

(56) References Cited

U.S. PATENT DOCUMENTS

| 6,493,767 | B1 | 12/2002 | Ishida et al. | |
|---|---|---|---|---|
| 7,570,647 | B2 | 8/2009 | Miyachi | |
| 2002/0040441 | A1* | 4/2002 | See et al. | 713/202 |
| 2003/0028808 | A1 | 2/2003 | Kameda | |
| 2003/0163577 | A1* | 8/2003 | Moon et al. | 709/229 |
| 2004/0048601 | A1* | 3/2004 | Lee et al. | 455/410 |
| 2004/0229614 | A1* | 11/2004 | Kim et al. | 455/435.1 |
| 2008/0134288 | A1* | 6/2008 | Halasz et al. | 726/2 |

FOREIGN PATENT DOCUMENTS

| CN | 1496152 A | 5/2004 |
|---|---|---|
| JP | 09-200262 | 7/1997 |
| JP | 2001-036561 A | 2/2001 |
| JP | 2002-124952 A | 4/2002 |
| JP | 2003-046533 A | 2/2003 |
| JP | 2003-224576 A | 8/2003 |
| JP | 2004-06424 A | 2/2004 |
| JP | 2004-64204 A | 2/2004 |

* cited by examiner

Primary Examiner — Kim Vu
Assistant Examiner — Suman Debnath
(74) Attorney, Agent, or Firm — Foley & Lardner LLP

(57) ABSTRACT

A DHCP server 8 dispenses an IP address in response to a request from a terminal equipment 1. An authentication server 3 receives an authentication frame transmitted from the terminal equipment 1 using the dispensed IP address as a sender address and authenticates the terminal equipment 1. Upon completion of authentication, the authentication server 3 informs a registration information database 22 of an authentication hub 2 of communication permission for the terminal equipment 1. In the authentication hub 2, a frame receiving circuit 21 receives a transmission frame transmitted from the terminal equipment 1. The authentication hub 2 refers to the registration information database 22 on the basis of sender information of the transmission frame, determines transmission, rewriting-and-transmission, or discarding for the frame, and sends the transmission frame to a transmission buffer 23 if transmission or rewriting-and-transmission is permitted for the frame.

22 Claims, 8 Drawing Sheets

| DESTINATION IDENTIFIER | UNICAST TRANSMISSION PERMISSION FLAG | BROADCAST REWRITING PERMISSION FLAG |
|---|---|---|
| AAAA | PERMITTED or INHIBITED | PERMITTED or INHIBITED |
| ⋮ | ⋮ | ⋮ |
| BBBB | PERMITTED or INHIBITED | PERMITTED or INHIBITED |

| TERMINAL IDENTIFIER | AUTHENTICATION FLAG |
|---|---|
| CCCC | AUTHENTICATED or UNAUTHENTICATED |
| ⋮ | ⋮ |
| DDDD | AUTHENTICATED or UNAUTHENTICATED |

AUTHENTICATION SYSTEM, NETWORK LINE CONCENTRATOR, AUTHENTICATION METHOD AND AUTHENTICATION PROGRAM

This application claims priority to prior Japanese patent application JP 2004-206662, the disclosure of which is incorporated herein by reference.

BACKGROUND OF THE INVENTION

The present invention relates to an authentication system, a network line concentrator, an authentication method used therefor, and a program for executing the method and, in particular, to a method of restricting access at an authentication hub when a terminal equipment is connected to a network.

At present, as a method of restricting access at an authentication hub, use is made of an IEEE (Institute of Electrical and Electronic Engineers) 802.1x authentication system illustrated in FIG. 1 and an authentication VLAN (Virtual Local Area Network) system illustrated in FIG. 2.

Referring to FIG. 1, the IEEE 802.1x authentication system will be described. In the IEEE 802.1x authentication system, an authentication hub 32 performs authenticating operation substitutionally for an authentication server 33 in response to an access to the authentication hub 32 from a terminal equipment 31 in the following manner. Before authentication, all ordinary frames transmitted from the terminal equipment 31 are discarded at the authentication hub 32 and the authentication hub 32 receives an authentication frame alone. That is, the authentication hub 32 carries out communication restriction. The authentication hub 32 extracts sender information (including a sender address, a user name, a password, and so on) from the authentication frame and transmits an authentication acknowledgment frame to the authentication server 33. In this manner, the authentication hub 32 substitutionally performs the authenticating operation.

If the authentication server 33 acknowledges authentication for the authentication acknowledgment frame, the authentication server 33 sends, to the authentication hub 32, a permission setting frame for setting communication permission with respect to a frame from a port connected to the terminal equipment 31 or a frame having a MAC (Media Access Control) address specific to the terminal equipment 31 as a sender address.

In response to the permission setting frame, the authentication hub 32 cancels the communication restriction. Thereafter, the terminal equipment 31 is connectable to a network 300 through the authentication hub 32, a switching hub 34, and a router 35.

Referring to FIG. 2, the authentication VLAN system will be described. In the authentication VLAN system, a terminal equipment 41 is allowed to participate in a pre-authentication network 401 called a default LAN and having a limited connection range (for example, see Japanese Unexamined Patent Application Publication (JP-A) No. 2004-64204).

The terminal equipment 41 requests a DHCP (Dynamic Host Configuration Protocol) server 46 connectable from the pre-authentication network 401 to dispense a temporary IP (Internet Protocol) address and sends an authentication request to an authentication server 43 with the provisional IP address.

If the authentication server 43 acknowledges authentication for the authentication request, the authentication server 43 indicates, to the DHCP server 46 and an authentication hub 42, a VLAN (post-authentication network 402) which the terminal equipment 41 should belong to.

The DHCP server 46 releases the provisional IP address assigned to the terminal equipment 41 and informs the terminal equipment 41 of an IP address for the post-authentication network 402. The authentication hub 42 permits the terminal equipment 41 to establish connection to the post-authentication network 402 indicated by the authentication server 43. Thereafter, the terminal equipment 41 is connectable to a network 400 through the authentication hub 42, a switching hub 44, and a router 45.

However, the above-mentioned conventional method of restricting access at the authentication hub is disadvantageous in the following respects.

In case of the IEEE 802.1x authentication system, a protocol specific to the authentication system is used so that the authentication hub must be provided with a special program for authentication of the terminal equipment.

Further, in case of the IEEE 802.1x authentication system, the authentication hub relays an authentication process between the terminal equipment and the authentication server. This process is executed as a software operation. Therefore, the authentication hub is required to have a high software processability.

Further, in case of the IEEE 802.1x authentication system, an unauthenticated terminal equipment can not be connected to the network. Therefore, it is impossible to provide limited functions to the unauthenticated terminal equipment.

On the other hand, in the authentication VLAN system, switching from the pre-authentication network to the post-authentication network permitted by authentication occurs after completion of authentication. At this time, the terminal equipment must change network setting. Therefore, a long time will be required until communication can be actually carried out after completion of authentication. Sometimes, restriction is imposed upon the type of an OS (Operating System) which can be used at the terminal equipment.

In case of the authentication VLAN system, a plurality of devices must be cooperated for an authenticating operation. As a result, those devices usable for the system are limited. For example, the DHCP server must lease the IP address according to the request from the authentication server. Therefore, a special-purpose DHCP server is required or, alternatively, the DHCP server must be provided with a function addition program.

Further, in case of the authentication VLAN system, the authentication hub is required to have advanced functions such as VLAN switching and trunking of a plurality of VLANS. Therefore, the authentication hub itself becomes an expensive highly-functional equipment.

SUMMARY OF THE INVENTION

It is therefore an object of this invention to provide an authentication system, a network line concentrator, an authentication method used therefor, and a program for executing the method which are capable of preventing hacking, tapping, or attacking by an unauthorized user to assure security without using a complicated system, network switching, and a highly-functional authentication apparatus.

According to this invention, there is provided an authentication system including a network line concentrator and an authentication server for authenticating a terminal equipment accommodated in the network line concentrator, wherein the network line concentrator comprises a unit for restricting transfer of a frame transmitted from any other node except an authenticated terminal equipment authenticated by the authentication server to the inside and the outside of a network including the authentication server.

According to this invention, there is also provided a network line concentrator for accommodating a terminal equipment which is authenticated by an authentication server, the network line concentrator comprising a unit for restricting transfer of a frame transmitted from any other node except an authenticated terminal equipment authenticated by the authentication server to the inside and the outside of a network including the authentication server.

According to this invention, there is also provided an authentication method for use in an authentication system including a network line concentrator and an authentication server for authenticating a terminal equipment accommodated in the network line concentrator, the method comprising a step of restricting transfer of a frame transmitted from any other node except an authenticated terminal equipment authenticated by the authentication server to the inside and the outside of a network including the authentication server, the step being performed in the network line concentrator.

According to this invention, there is also provided a program of an authentication method for use in an authentication system including a network line concentrator and an authentication server for authenticating a terminal equipment accommodated in the network line concentrator, the program being for making a computer execute processing of restricting transfer of a frame transmitted from any other node except an authenticated terminal equipment authenticated by the authentication server to the inside and the outside of a network including the authentication server.

Thus, in a network line concentrator of a variable broadcast range type (hereinafter referred to as an authentication hub) according to this invention, security under a LAN (Local Area Network) environment is assured by restricting transfer of a frame supplied from an unauthorized terminal equipment other than an authorized terminal equipment permitted by an authentication server to an inside and an outside of a network.

More in detail, the authentication hub according to this invention restricts transmission of a unicast frame transmitted from a terminal equipment and rewrites a broadcast frame essential for an authenticating operation, such as IP (Internet Protocol) address acquisition and ARP (Address Resolution Protocol) solution, into a unicast frame addressed to a permitted destination. In this manner, only a necessary network node (for example, the authentication server) is rendered accessible.

The authentication hub according to this invention is not required to have advanced functions such as the function of substitutionally handling the authenticating operation or the function of switching the VLAN (Virtual Local Area Network) as in the conventional method. Therefore, it is unnecessary to use a highly-functional device such that functions and performance of software are questioned. The reason is as follows.

Upon carrying out communication (authenticating operation) between a node (that is, a terminal equipment) and the authentication server, the authentication hub according to this invention is operable to pass communication between the node and the authentication server and other necessary communications alone without blocking all communications from unauthenticated nodes and without substitutionally transmitting an authentication frame to the authentication server. Therefore, the authentication hub itself need not be involved in the authenticating operation. Accordingly, the authentication hub in this invention need not be adapted to the protocol between the node and the authentication server and need not have the function of preparing and transmitting the frame.

The authentication hub in this invention does not separately use the VLAN to change the communication range before and after authentication but limits the destination before authentication. Therefore, the authentication hub in this invention need not carry out the network switching operation and need not have the VLAN function itself. In this case, in the authentication hub in this invention, a software-intervening portion is only involved in transmission and reception of a table between the authentication hub and the authentication server. Therefore, the authentication hub can be implemented by very simple hardware functions including a packet filtering function, a packet duplicating function, and an address rewriting function as well as software functions including a function of rewriting the table in the authentication hub from the authentication server.

Further, the authentication hub in this invention permits an unauthenticated node to carry out a part of communications. Specifically, the authentication hub in this invention has a transmittable node entry table indicating transmittable nodes from a limitation-imposed node so that a frame received from the limitation-imposed node and addressed to the entry table is rendered transmittable without discarding all reception frames from nodes except an authenticated node.

Further, with the authentication hub in this invention, it is unnecessary to change network setting of a terminal before and after authentication. In the above-mentioned authentication VLAN system, a VLAN in which the limitation-imposed node participates is different from a VLAN in which the authenticated node participates. Thus, the communication range of a communicable node is changed. In the above-mentioned authentication VLAN system, the network is changed following switching of the VLAN so that network setting must be changed at the node also. On the other hand, in the authentication hub in this invention, the network is not switched before and after authentication but the transmittable destination is changed. It is therefore unnecessary to switch the network setting at the terminal.

Thus, the authentication hub in this invention prevents the terminal equipment from accessing to other network nodes (other servers and authenticated terminal equipments) through the switching hub and the router. It is therefore possible to prevent hacking, tapping, and attacking by an unauthorized user to assure the security without using a complicated system, network switching, and a highly-functional authentication device.

With the structure and the operation described below, this invention achieves the effect of prevent hacking, tapping, and attacking by an unauthorized user to assure the security without using a complicated system, network switching, and a highly-functional authentication device.

BRIEF DESCRIPTION OF THE DRAWING

FIGS. 6A and 6B are views showing information stored in a registration information database in the authentication hub illustrated in FIG. 4;

DESCRIPTION OF THE PREFERRED EMBODIMENT

Figure 1:
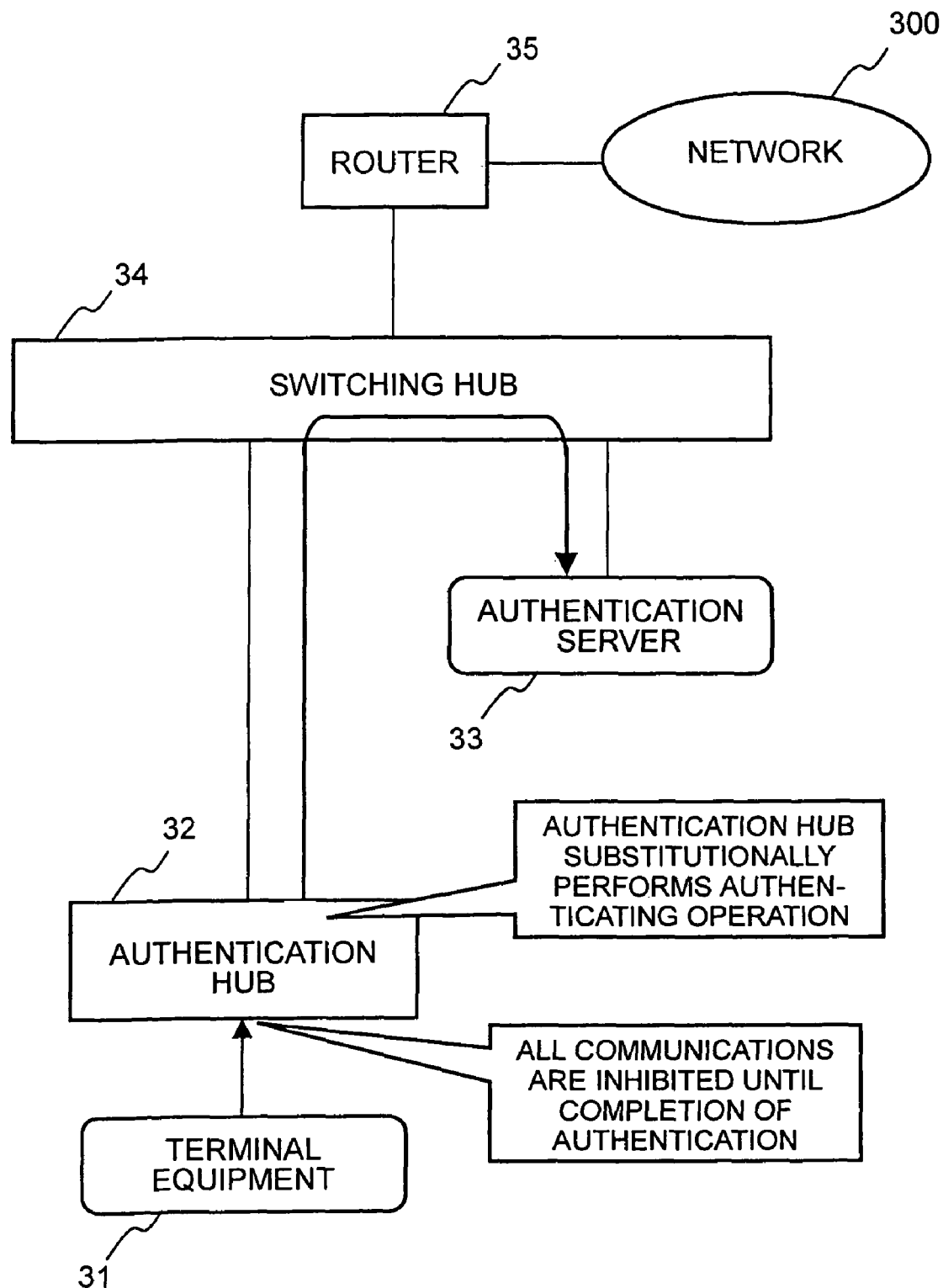
FIG. 1 is a block diagram showing a conventional IEEE 802.1x authentication system.
Figure 2:
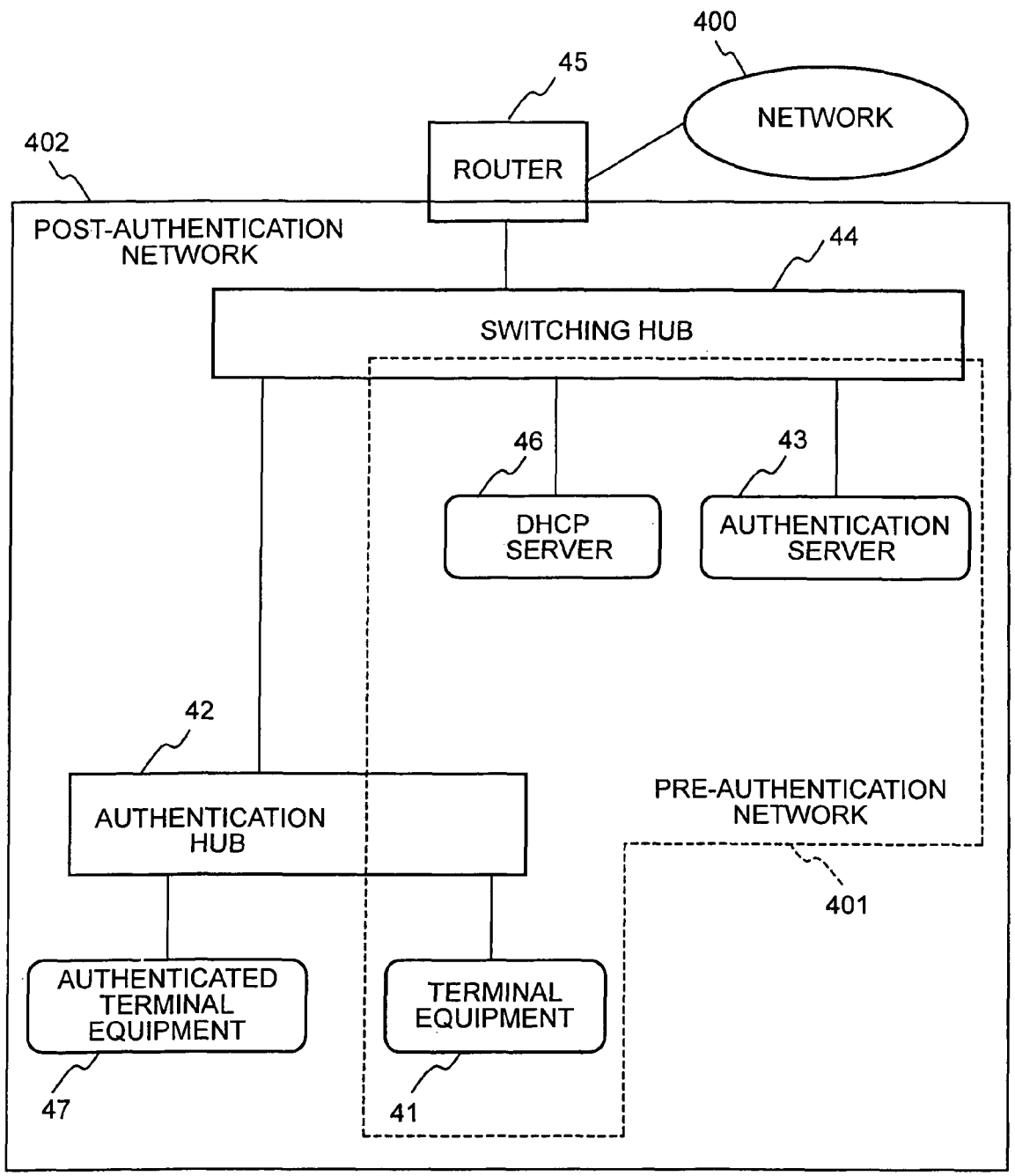
FIG. 2 is a block diagram showing a conventional authentication VLAN system.

Now, this invention will be described with reference to the drawing.

Figure 3:
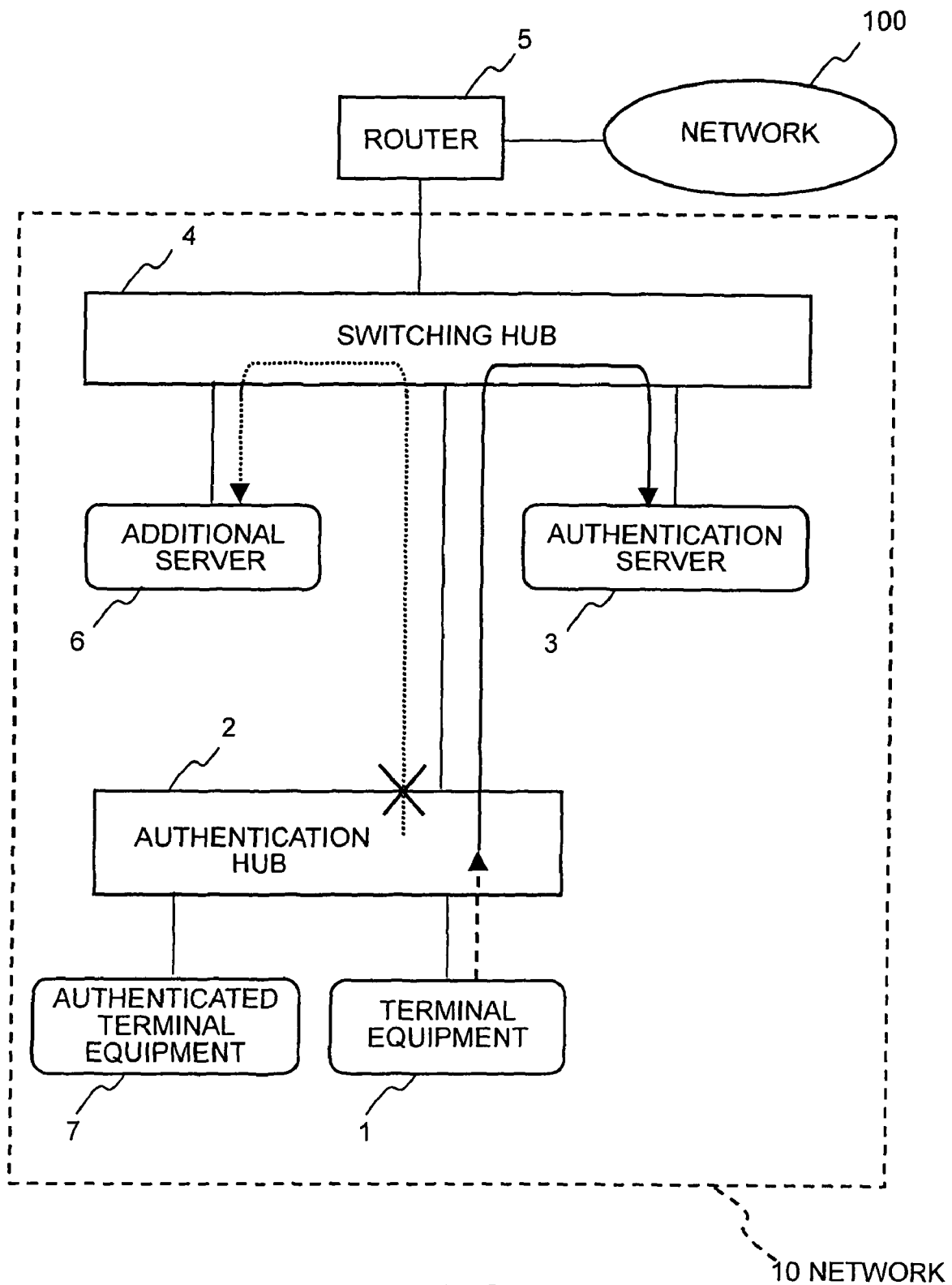
FIG. 3 is a block diagram showing a basic structure of an authentication system according to this invention.

Referring to FIG. 3, an authentication system according to this invention basically comprises a terminal equipment 1, a network line concentrator of a variable broadcast range type (hereinafter referred to as an authentication hub) 2, an authentication server 3, a switching hub 4, a router 5, and an additional server 6, and an authenticated terminal equipment 7. The authentication hub 2 includes a unit (21-24 in FIG. 4) for restricting transfer of a frame transmitted from any other node except an authenticated terminal equipment authenticated by the authentication server 3 to the inside and the outside of a network 10 including the authentication server 3. That is, the authentication hub 2 restricts access from the terminal equipment 1 through the switching hub 4 and the router 5 to an outer network 100 outside the network 10. The authentication hub 2 also restricts access from the terminal equipment 1 through the switching hub 4 and the router 5 to other network nodes (including the additional server 6 and the authenticated terminal equipment 7) inside the network 10.

The authentication hub 2 restricts transmission of a unicast frame transmitted from the terminal equipment 1 and rewrites a broadcast frame essential for an authenticating operation including IP (Internet Protocol) address acquisition and ARP (Address Resolution Protocol) solution into a unicast frame addressed to a permitted destination. In this manner, only a necessary network note (the authentication server 3) is rendered accessible.

The authentication hub 2 prevents the terminal equipment 1 from accessing to other network nodes (including the additional server 6 and the authenticated terminal equipment 7) through the switching hub 4 and the router 5. It is therefore possible to prevent hacking, tapping, and attacking by an unauthorized user to assure the security without using a complicated system, network switching, and a highly-functional authentication device.

Figure 4:
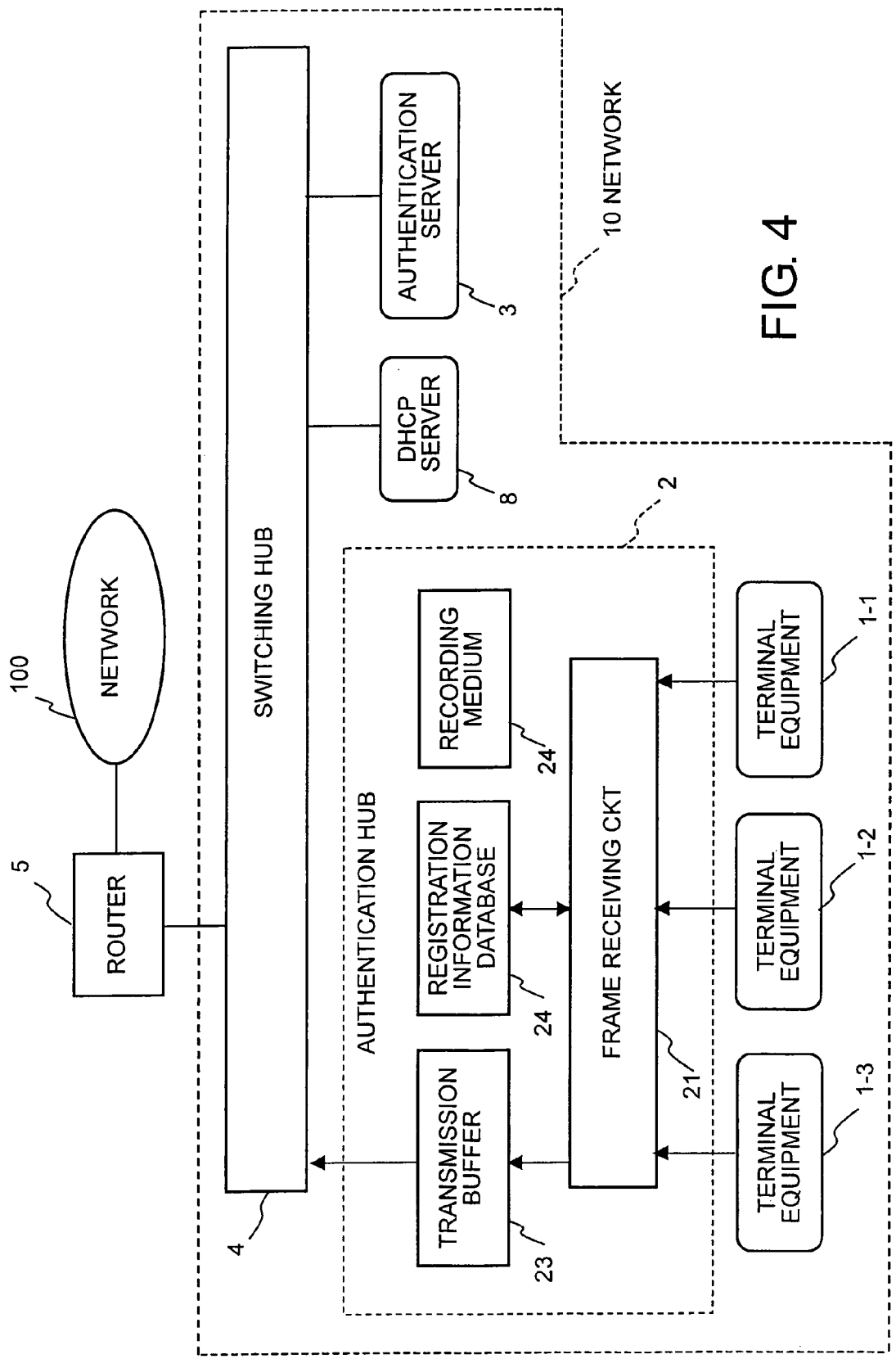
FIG. 4 is a block diagram showing an authentication system according to one embodiment of this invention.

Next referring to FIG. 4, an authentication system according to an embodiment of this invention comprises a plurality of terminal equipments 1-1 to 1-3 (each of which corresponds to the terminal equipment 1 in FIG. 3), an authentication hub 2, an authentication server 3, a DHCP (Dynamic Host Configuration Protocol) server 8, a switching hub 4 connecting those network nodes, a router 5, and a network 100 connected via the router 5.

The authentication hub 2 comprises a frame receiving circuit 21, a registration information database 22, a transmission buffer 23, and a recording medium 24 storing a program (computer-executable program) for various kinds of control in the authentication hub 2. The authentication hub 2 may be implemented by an integrated circuit chip formed by integrating the frame receiving circuit 21, the registration information database 22, the transmission buffer 23, and the recording medium 24.

In response to requests from the terminal equipments 1-1 to 1-3, the DHCP server 8 dispenses IP addresses. The authentication server 3 receives authentication frames transmitted from the terminal equipments 1-1 to 1-3 using the dispensed IP addresses as sender addresses and authenticates the terminal equipments 1-1 to 1-3 (users). Upon completion of authentication of the terminal equipments 1-1 to 1-3, the authentication server informs the registration information database 22 of the authentication hub 2 of communication permission (authentication completion) for the terminal equipments 1-1 to 1-3.

In the authentication hub 2, the frame receiving circuit 21 receives transmission frames transmitted from the terminal equipments 1-1 to 1-3. Referring to the registration information database 22 on the basis of sender information in each transmission frame, the authentication hub 2 determines transmission, rewriting-and-transmission, or discarding for each frame and transmits a transmission-permitted frame or a rewriting-and-transmission-permitted frame to the transmission buffer 23.

Figure 5:
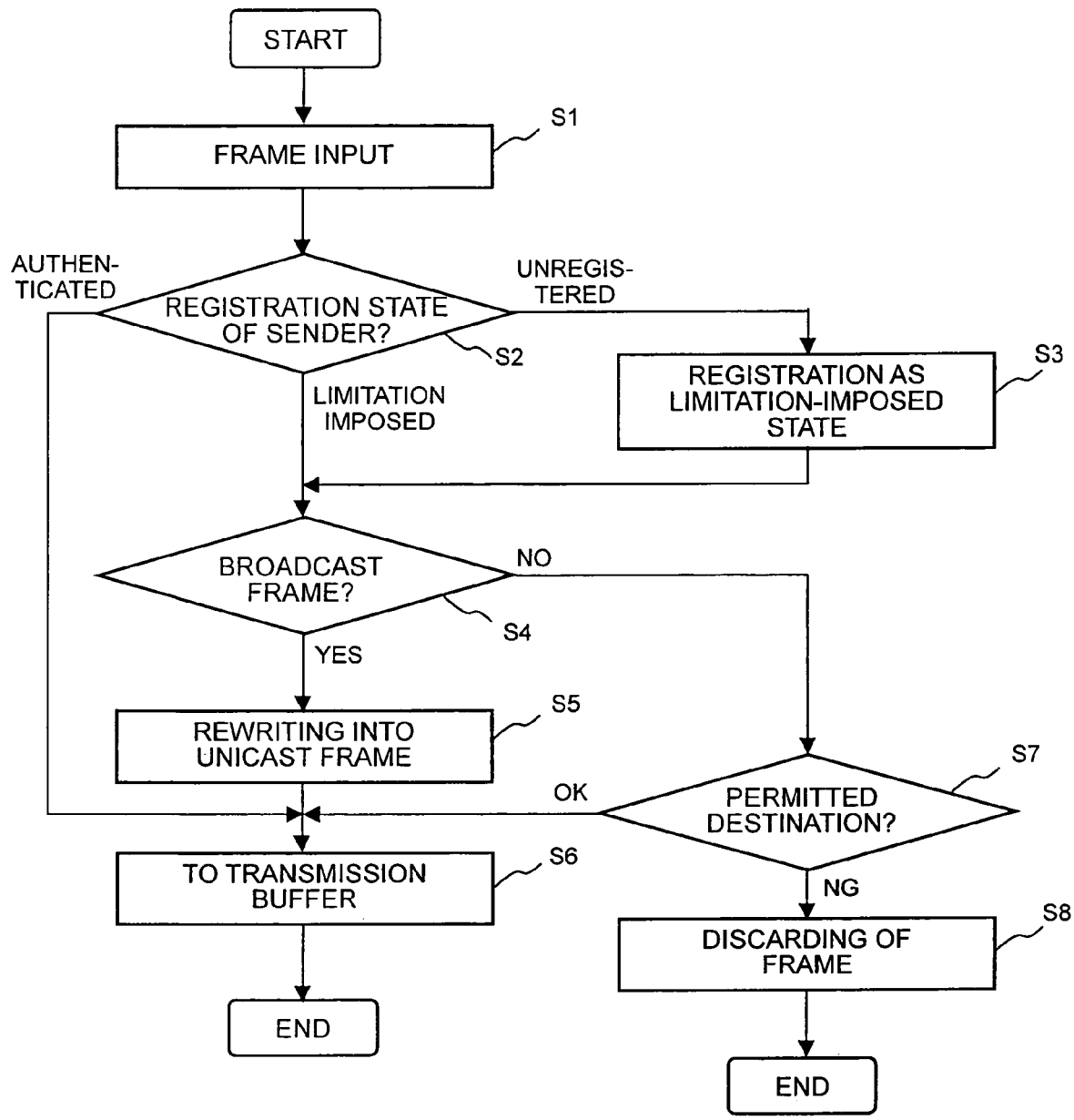
FIG. 5 is a flow chart for describing an operation of an authentication hub illustrated in FIG. 4.

Referring to FIG. 5 in addition to FIG. 4, operation of the authentication hub 2 will be described. Processing shown in FIG. 5 is realized by the authentication hub 2 executing the program stored in the recording medium 24.

For each input frame, the authentication hub 2 confirms a registration state of a sender of the frame in the registration information database 22 (steps S1 and S2 in FIG. 5). If the registration state of the sender of the frame is "authenticated", the authentication hub 2 sends the frame to the transmission buffer 23 (step S6 in FIG. 5). Thereafter, the frame is transmitted from a destination port.

If the registration state of the sender of the frame is "unregistered", the authentication hub 2 registers the sender of the frame in the registration information database 22 as a "limitation-imposed" terminal (step S3 in FIG. 5). Thereafter or if the registration state of the sender of the frame is "limitation-imposed", the authentication hub 2 judges whether the "limitation-imposed" frame is a broadcast frame or a unicast frame (step S4 in FIG. 5).

In case of the broadcast frame, the authentication hub 2 rewrites the frame from the broadcast frame into a unicast frame addressed to a destination designated by the registration information database 22 (step S5 in FIG. 5) and, thereafter, sends the frame to the transmission buffer 23 (step S6 in FIG. 5). Thereafter, the frame is transmitted from the destination port.

On the other hand, in case of the unicast frame, the authentication hub 2 confirms a destination of the frame (step S7 in FIG. 5). If the destination of the frame is a permitted destination according to setting in the registration information database 22, the authentication hub 2 sends the frame to the transmission buffer 23 (step S6 in FIG. 5). Thereafter, the frame is transmitted from the destination port.

If the destination of the frame is an unpermitted destination according to setting in the registration information database 22, the authentication hub 2 discards the frame (step S8 in FIG. 5).

Referring to FIGS. 6A and 6B, stored information in the registration information database 22 of the authentication hub 2 will be described. FIG. 6A shows a frame transmittable node entry 22a for a limitation-imposed terminal. FIG. 6B shows a terminal equipment registration information entry 22b. Thus, the stored information stored in the registration information database 22 is classified into two entries including the frame transmittable node entry 22a and the terminal equipment registration information entry 22b.

The frame transmittable node entry 22a for a limitation-imposed terminal stores information about network nodes to which a unicast or a broadcast frame is transmittable from the limitation-imposed terminal. The frame transmittable node entry 22a includes a destination identifier 221a of a transmittable network node, a unicast transmission permission flag 222a determining permission or inhibition of transmission of a unicast frame, and a broadcast rewriting permission flag 223a determining permission or inhibition of transmission of a rewritten frame rewritten from a broadcast frame into a unicast frame.

As the destination identifier 221a, use may be made of a "MAC (Media Access Control) address", an "IP address", or a combination thereof. As a network node registered for the destination identifier 221a, the authentication server 3 or the DHCP server 8 may be registered. To the destination identifier 221a, a DNS (Domain Name System) server or the like may be added if necessary.

The terminal equipment registration information entry 22b stores information about an authentication state of a terminal equipment 1. The entry 22b includes a terminal identifier 221b of the terminal equipment and an authentication flag 222b indicative of whether the terminal equipment is in an authenticated state or a limitation-imposed state. As the terminal identifier 221b, use may be made of the "MAC address".

Figure 7:
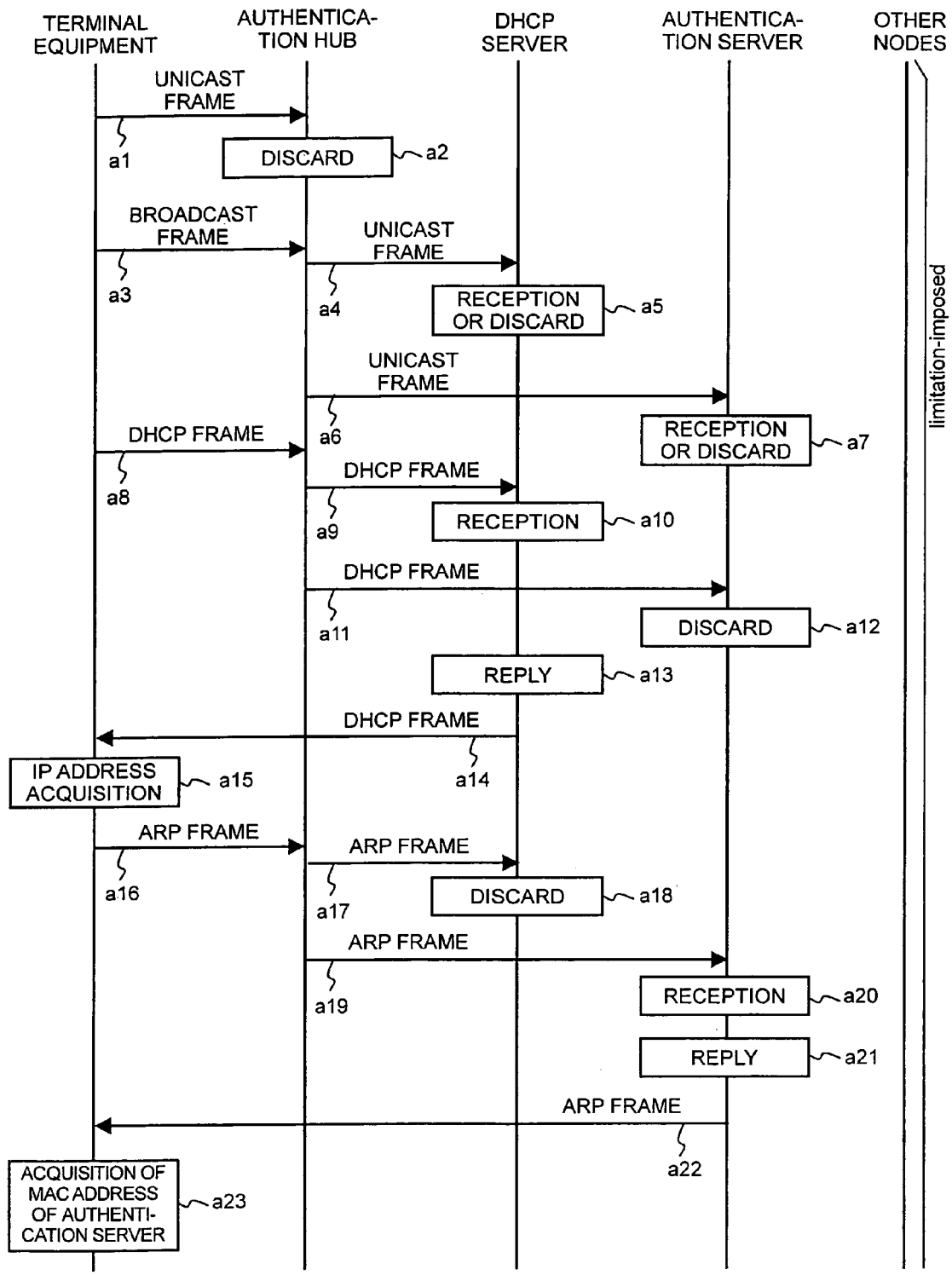
FIG. 7 is a sequence chart showing a first part of operation of the authentication system illustrated in FIG. 4.
Figure 8:
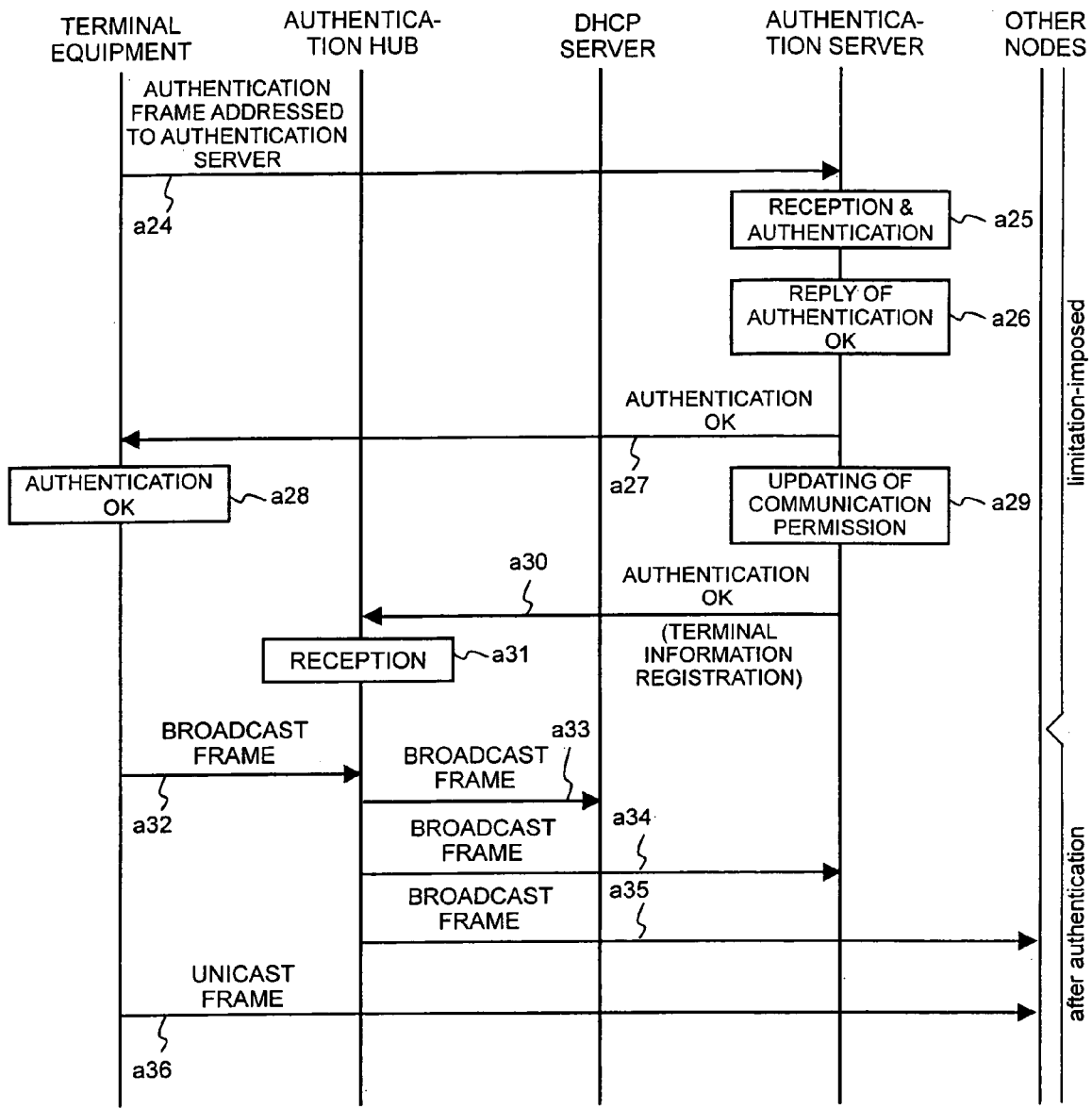
FIG. 8 is a sequence chart showing a second part of operation following the first part illustrated in FIG. 7.

Referring to FIGS. 7 and 8 in addition to FIGS. 4 through 6A and 6B, description will be made of operation of the authentication system according to the embodiment of this invention. The operation of the authentication system according to the embodiment of this invention is executed by the terminal equipment 1, the authentication hub 2, the DHCP server 8, and the authentication server 3. In FIGS. 7 and 8, other nodes represent other network apparatuses and terminal equipments connected via the authentication hub 2, the switching hub 4, and the router 5.

If the terminal equipment 1 is a "limitation-imposed" terminal, the authentication hub 2 refers to the registration information database 22 to confirm whether or not a unicast frame transmitted from the terminal equipment 1 is coincident with a unicast-transmission-permitted entry in the frame transmittable node entry 22a for the limitation-imposed terminal equipment. In case where a destination of the unicast frame is not a transmission-permitted network node, the authentication hub 2 discards the unicast frame (a1, a2 in FIG. 7). If the unicast frame is addressed to a transmission-permitted network node, the unicast frame is transmitted as it is.

A broadcast frame transmitted from the terminal equipment 1 is rewritten by the authentication hub 2 into a unicast frame addressed to a network node permitted by the broadcast rewriting permission flag 223a in the frame transmittable node entry 22a for the limitation-imposed terminal in the registration information database 22, and is thereafter transmitted (a3, a4, a6 in FIG. 7).

In this embodiment, the DHCP server 8 and the authentication server 3 are transmittable network nodes. The DHCP server 8 and the authentication server 3 receive or discard the unicast frame transmitted thereto (a5, a7 in FIG. 7).

If the terminal equipment 1 accesses to the DHCP server 8 in order to acquire an IP address of the DHCP server 8, the terminal equipment 1 transmits a DHCP frame as a broadcast frame (a8 in FIG. 7). Supplied with the DHCP frame as a broadcast frame, the authentication hub 2 transmits the DHCP frame as a unicast frame addressed to the DHCP server 8 and the authentication server 3 (a9, a11 in FIG. 7).

Since the unicast frame supplied thereto is not an authentication frame, the authentication server 3 discards the unicast frame (a12 in FIG. 7). The DHCP server 8 receives the unicast frame as a DHCP request, dispenses an IP address, and transmits a reply DHCP frame to the terminal equipment 1 (a10, a13, a14 in FIG. 7). The terminal equipment 1 acquires the IP address of the DHCP server 8 from the reply DHCP frame supplied thereto (a15 in FIG. 7).

In case where user authentication is carried out, the terminal equipment 1 transmits an ARP frame as a broadcast frame in order to acquire a MAC address from an IP address of the authentication server 3 (a16 in FIG. 7). Supplied with the ARP frame received as a broadcast frame, the authentication hub 2 transmits the ARP frame as a unicast frame addressed to the DHCP server 8 and the authentication server 3 (a17, a19 in FIG. 7).

Since the ARP frame supplied to the DHCP server 8 does not contain the IP address assigned thereto, the DHCP server 8 discards the ARP frame (a18 in FIG. 7). Since the ARP frame received by the authentication server 3 contains the IP address assigned thereto, the authentication server 3 transmits a reply ARP frame for the ARP frame (a20 to a22 in FIG. 7).

The terminal equipment 1 can acquire the MAC address from the reply ARP frame received from the authentication server 3 (a23 in FIG. 7). Therefore, the terminal equipment 1 transmits to the authentication server 3 a unicast frame as an authentication frame addressed to the MAC address (a24 in FIG. 8). The authentication hub 2 transmits the unicast frame (authentication frame) received from the terminal equipment 1 as it is because the destination of the unicast frame is a transmission-permitted network node.

Upon completion of authentication between the terminal equipment 1 and the authentication server 3, the authentication server 3 sends an authentication OK frame to the terminal equipment 1 (a25 to a27 in FIG. 8). Then, the terminal equipment 1 is recognized as an authenticated state (a28 in FIG. 8). The authentication server 3 accesses to the registration information database 22 of the authentication hub 2 (authentication OK frame) (a29, a30 in FIG. 8) to update the authentication flag 222b from "unauthenticated" into "authenticated" with respect to the corresponding terminal equipment entry in the terminal equipment registration information entry 22b (a31 in FIG. 8).

After authentication, broadcast and unicast frames transmitted from the terminal equipment 1 are transmitted to destinations or all network nodes as they are (a32 to a36 in FIG. 8).

Thus, in this embodiment, the authentication hub 2 restricts transmission of the unicast frame transmitted from the terminal equipment 1 and rewrites the broadcast frame essential for the authenticating operation such as IP address acquisition and ARP solution into a unicast frame addressed to a permitted destination. In this manner, a necessary network node (for example, the authentication server) alone is accessible.

In this embodiment, the authentication hub 2 is not required to have advanced functions such as the function of substitutionally handling the authenticating operation or the function of switching the VLAN (Virtual Local Area Network) as in the conventional method. Therefore, it is unnecessary to use a highly-functional device such that functions and performance of software are questioned. The reason is as follows.

In this embodiment, upon carrying out communication (authenticating operation) between a node and the authentication server 3, the authentication hub 2 is operable to pass communication between the node and the authentication server 3 and other necessary communications alone without blocking all communications from unauthenticated nodes and without substitutionally transmitting an authentication frame to the authentication server 3. Therefore, the authentication hub 2 itself need not be involved in the authenticating operation. Accordingly, the authentication hub 2 in this embodiment need not be adapted to the protocol between the node and the authentication server 3 and need not have the function of preparing and transmitting the frame.

In this embodiment, the authentication hub 2 does not separately use the VLAN to change the communication range before and after authentication but limits the destination before authentication. Therefore, the authentication hub 2 need not carry out the network switching operation and need not have the VLAN function itself. In this case, in the authentication hub 2, a software-intervening portion is only involved in transmission and reception of a table between the authentication hub 2 and the authentication server 3. Therefore, the authentication hub 2 can be implemented by very simple hardware functions including a packet filtering function, a packet duplicating function, and an address rewriting function as well as software functions including a function of rewriting the table in the authentication hub from the authentication server.

Further, in this embodiment, the authentication hub 2 permits an unauthenticated node to carry out a part of communications. Specifically, the authentication hub 2 has a transmittable node entry table indicating transmittable nodes from a limitation-imposed node so that a frame received from the limitation-imposed node and addressed to the entry table is rendered transmittable without discarding all reception frames from nodes except an authenticated node.

Further, with the authentication hub 2 in this embodiment, it is unnecessary to change network setting of a terminal before and after authentication. In the above-mentioned authentication VLAN system, a VLAN in which the limitation-imposed node participates is different from a VLAN in which the authenticated node participates. Thus, the communication range of a communicable node is changed. In the above-mentioned authentication VLAN system, the network is changed following switching of the VLAN so that network setting must be changed at the node also. On the other hand, in the authentication hub 2 in this embodiment, the network is not switched before and after authentication but the transmittable destination is changed. It is therefore unnecessary to switch the network setting at the terminal.

Thus, the authentication hub 2 in this embodiment prevents the terminal equipment 1 from accessing to other network nodes (the additional server 6 and the authenticated terminal equipment 7) through the switching hub 4 and the router 5. It is therefore possible to prevent hacking, tapping, and attacking by an unauthorized user to assure the security without using a complicated system, network switching, and a highly-functional authentication device.

In the foregoing embodiment, description has been made of restriction of access to the inside of the network. However, it is possible to restrict access to the outside of the network. In case where a destination is outside of the network, a destination MAC address is an address of a router acting as a default gateway and a destination IP address is an IP address of a target network node. The above-mentioned two addresses are stored as a destination identifier in a frame transmittable node entry corresponding to a limitation-imposed terminal and permission or inhibition of transmission is judged with reference to the frame transmittable node entry.

While the present invention has thus far been described in connection with the preferred embodiment thereof, it will readily be possible for those skilled in the art to put this invention into practice in various other manners.

What is claimed is:

1. An authentication system including a network line concentrator and an authentication server for authenticating a terminal equipment accommodated in said network line concentrator, wherein said network line concentrator comprises a unit for restricting transfer of a frame except an authentication request frame transmitted from any other node except an authenticated terminal equipment authenticated by said authentication server to an inside and an outside of a network including said authentication server, wherein said unit for restricting transfer of a frame enables the terminal equipment to access only the authentication server via the authentication request frame before authentication, wherein said authentication server receives an authentication request frame transmitted by the terminal equipment using a dispensed IP address as a sender address and authenticates the terminal equipment, wherein, upon completion of authentication, said authentication server informs a registration information database of an authentication hub of communication permission for the terminal equipment, wherein, when a frame receiving circuit of said authentication hub receives a frame transmitted from the terminal equipment:

said authentication hub refers to the registration information database on the basis of sender information of the frame to determine whether: i) transmission, ii) rewriting-and-transmission, or iii) discarding are to be performed for the frame, and said authentication hub sends the frame to a transmission buffer when said authentication hub has determined that the transmission or the rewriting-and-transmission are to be performed for the frame.

2. The authentication system as claimed in claim 1, wherein said unit for restricting transfer of a frame restricts transmission of a unicast frame transmitted from the terminal equipment and rewrites a broadcast frame essential for an authenticating operation for the terminal equipment into a unicast frame addressed to a preliminarily permitted destination, wherein the preliminary permitted destination corresponds to the authentication server.

3. The authentication system as claimed in claim 2, wherein the network line concentrator is of a variable broadcast range type capable of rewriting the broadcast frame into the unicast frame.

4. The authentication system as claimed in claim 2, wherein the authenticating operation at least includes IP (Internet Protocol) address acquisition and ARP (Address Resolution Protocol) solution.

5. The authentication system as claimed in claim 1, wherein said unit for restricting transfer of a frame at least inhibits access to any other node except said authenticated terminal equipment through a switching hub inside the network and a router outside the network before authentication.

6. The authentication system as claimed in claim 1, wherein said network line concentrator is an integrated circuit formed by integrating at least said unit for restricting transfer of a frame.

7. A network line concentrator for accommodating a terminal equipment which is authenticated by an authentication server, said network line concentrator comprising:

a unit for restricting transfer of a frame except an authentication request frame transmitted from any other node except an authenticated terminal equipment authenticated by the authentication server to an inside and an outside of a network including said authentication server, wherein said unit for restricting transfer of a frame enables the terminal equipment to access only the authentication server via the authentication request frame before authentication, wherein said authentication server receives an authentication request frame transmitted by the terminal equipment using a dispensed IP address as a sender address and authenticates the terminal equipment, wherein, upon completion of authentication, said authentication server informs a registration information database of an authentication hub of communication permission for the terminal equipment, wherein, when a frame receiving circuit of the authentication hub receives a frame transmitted from the terminal equipment:

said authentication hub refers to the registration information database on the basis of sender information of the frame to determine whether: i) transmission, ii) rewriting-and-transmission, or iii) discarding are to be performed for the frame, and said authentication hub sends the frame to a transmission buffer when said authentication hub has determined that the transmission or the rewriting-and-transmission are to be performed for the frame.

8. The network line concentrator as claimed in claim 7, wherein said unit for restricting transfer of a frame restricts transmission of a unicast frame transmitted from the terminal equipment and rewrites a broadcast frame essential for an authenticating operation for the terminal equipment into a unicast frame addressed to a preliminarily permitted destination, wherein the preliminary permitted destination corresponds to the authentication server.

9. The network line concentrator as claimed in claim 8, wherein the network line concentrator is of a variable broadcast range type capable of rewriting the broadcast frame into the unicast frame.

10. The network line concentrator as claimed in claim 8, wherein the authenticating operation at least includes IP (Internet Protocol) address acquisition and ARP (Address Resolution Protocol) solution.

11. The network line concentrator as claimed in claim 7, wherein said unit for restricting transfer of a frame at least inhibits access to any other node except said authenticated terminal equipment through a switching hub inside the network and a router outside the network before authentication.

12. The network line concentrator as claimed in claim 7, wherein said network line concentrator is an integrated circuit formed by integrating at least said unit for restricting transfer of a frame.

13. An authentication method for use in an authentication system including a network line concentrator and an authentication server for authenticating a terminal equipment accommodated in said network line concentrator, said method comprising:

a step of restricting transfer of a frame except an authentication request frame transmitted from any other node except an authenticated terminal equipment authenticated by said authentication server to an inside and an outside of a network including said authentication server, said step being performed in said network line concentrator, wherein the step of restricting transfer of a frame enables the terminal equipment to access only said authentication server via the authentication request frame before authentication, receiving, by said authentication server, an authentication request frame transmitted by the terminal equipment using a dispensed IP address as a sender address;

authenticating, by said authentication server, the terminal equipment based on information received in the receiving step, informing, by said authentication server upon completion of the authenticating step, a registration information database of an authentication hub of communication permission for the terminal equipment, receiving, by a frame receiving circuit of said authentication hub, a frame transmitted from the terminal equipment:

referring, by said authentication hub, to the registration information database on the basis of sender information of the frame to determine whether: i) transmission, ii) rewriting-and-transmission, or iii) discarding are to be performed for the frame, and sending, by said authentication hub, the frame to a transmission buffer when said authentication hub has determined that the transmission or the rewriting-and-transmission are to be performed.

14. The authentication method as claimed in claim 13, wherein said step of restricting transfer of a frame restricts transmission of a unicast frame transmitted from the terminal equipment and rewrites a broadcast frame essential for an authenticating operation for the terminal equipment into a unicast frame addressed to a preliminarily permitted destination, wherein the preliminary permitted destination corresponds to the authentication server.

15. The authentication method as claimed in claim 14, wherein the network line concentrator is of a variable broadcast range type capable of rewriting the broadcast frame into the unicast frame.

16. The authentication method as claimed in claim 14, wherein the authenticating operation at least includes IP (Internet Protocol) address acquisition and ARP (Address Resolution Protocol) solution.

17. The authentication method as claimed in claim 13, wherein said step of restricting transfer of a frame at least inhibits access to any other node except said authenticated terminal equipment through a switching hub inside the network and a router outside the network before authentication.

18. The authentication method as claimed in claim 13, wherein said network line concentrator is an integrated circuit formed by at least integrating a unit for restricting transfer of a frame.

19. A recording medium storing a program of an authentication method for use in an authentication system including a network line concentrator and an authentication server for authenticating a terminal equipment accommodated in said network line concentrator, said program being for making a computer execute processing of:

restricting transfer of a frame except an authentication request frame transmitted from any other node except an authenticated terminal equipment authenticated by said authentication server to an inside and an outside of a network including said authentication server, wherein the restricting enables the terminal equipment to access only said authentication server via the authentication request frame before authentication, receiving, by said authentication server, an authentication request frame transmitted by the terminal equipment using a dispensed IP address as a sender address;

authenticating, by said authentication server, the terminal equipment based on information received in the receiving step, informing, by said authentication server upon completion of the authenticating step, a registration information database of an authentication hub of communication permission for the terminal equipment, receiving, by a frame receiving circuit of said authentication hub, a frame transmitted from the terminal equipment:

referring, by said authentication hub, to the registration information database on the basis of sender information of the frame to determine whether: i) transmission, ii) rewriting-and-transmission, or iii) discarding are to be performed for the frame, and sending, by said authentication hub, the frame to a transmission buffer when said authentication hub has determined that the transmission or the rewriting-and-transmission are to be performed.

20. The recording medium according to claim 19, wherein the restricting transfer of a frame restricts transmission of a unicast frame transmitted from the terminal equipment and rewrites a broadcast frame essential for an authenticating operation for the terminal equipment into a unicast frame addressed to a preliminarily permitted destination, wherein the preliminary permitted destination corresponds to the authentication server.

21. The authentication system as claimed in claim 1, further comprising:

an authentication database storing, for each of a plurality of destination identifiers, a unicast transmission permission/inhibition flag and a broadcast rewriting permission/inhibition flag.

22. The network line concentrator as claimed in claim 8, further comprising:

an authentication database storing, for each of a plurality of destination identifiers, a unicast transmission permission/inhibition flag and a broadcast rewriting permission/inhibition flag.

* * * * *